United States Patent
Wang et al.

(10) Patent No.: US 6,806,675 B2
(45) Date of Patent: Oct. 19, 2004

(54) STEPPER MOTOR CONTROLLER

(75) Inventors: Bing Wang, Coppell, TX (US); Donny R. Walker, Coppell, TX (US); Brian J. Roth, Coppell, TX (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/970,592

(22) Filed: Oct. 4, 2001

(65) Prior Publication Data

US 2003/0067280 A1 Apr. 10, 2003

(51) Int. Cl.[7] .............................. H02P 8/18; H02P 8/12; H02P 8/22
(52) U.S. Cl. ........................ 318/685; 318/696; 318/254; 318/432; 318/434; 318/700
(58) Field of Search .................................. 318/685, 696, 318/254, 432, 434, 700; 310/49

(56) References Cited

U.S. PATENT DOCUMENTS

| | | | | |
|---|---|---|---|---|
| 4,164,697 A | * | 8/1979 | Everett | 318/696 |
| 4,297,625 A | * | 10/1981 | Newell | 318/696 |
| 4,336,484 A | * | 6/1982 | Marinko | 318/696 |
| 5,225,756 A | * | 7/1993 | Coutu | 318/696 |
| 5,264,770 A | * | 11/1993 | Coutu | 318/696 |
| 5,428,522 A | | 6/1995 | Zaher et al. | |
| 5,530,332 A | * | 6/1996 | Rees | 318/685 |
| 5,708,578 A | | 1/1998 | Peppiette et al. | |
| 5,742,139 A | * | 4/1998 | Kolomeitsev | 318/254 |
| 6,046,567 A | * | 4/2000 | Hayes | 318/696 |
| 6,049,184 A | | 4/2000 | Uggla et al. | |
| 6,119,046 A | | 9/2000 | Sporer | |
| 6,140,793 A | * | 10/2000 | Carr et al. | 318/696 |

FOREIGN PATENT DOCUMENTS

| | | |
|---|---|---|
| EP | 0242344 A | 10/1997 |
| EP | 0833439 A | 4/1998 |

* cited by examiner

*Primary Examiner*—David Martin
*Assistant Examiner*—Tyrone Smith
(74) *Attorney, Agent, or Firm*—Beth A. Vrioni (57) ABSTRACT

A stepper motor control circuit reduces ripple current by applying both fast and slow current decays to a motor phase when current is being reduced in the motor phase while following a falling current waveform. The control circuit uses an initial fast decay to reduce a winding current and then switches to a slow decay until a winding current is sampled again. The control circuitry samples a winding current and compares the sampled current to a reference current to determine if current is to be applied or reduced using fast and/or slow decay methods. Different phase current sample circuits allow either constant current sensing or selective current sensing.

13 Claims, 7 Drawing Sheets

FIG.5B ated to the rise and decay of the applied current. To regulate current, stepper motor drivers periodically apply and remove voltage to the motor windings since the constant application of voltage would otherwise result in excessive powerconsumption. Since the applied current decays with time after voltage is removed, positional phase current is periodically recharged in each winding to hold the motor at a predetermined position. This is usually accomplished by switching a high voltage across each winding and allowing the current to increase until the motor reaches the predetermined value then rapidly switching off the voltage.

STEPPER MOTOR CONTROLLER

TECHNICAL FIELD OF THE INVENTION

The present invention relates generally to stepper motors and in particular the present invention relates to controlling stepper motor currents.

BACKGROUND OF THE INVENTION

Stepping motors can be viewed as electric motors without commutators. Typically, all windings in a stepper motor are part of the stator, and a rotor is either a permanent magnet or, in the case of variable reluctance motors, a toothed block of some magnetically soft material or a hybrid of both. All of the commutation is handled externally by a motor controller, and typically, the motors and controllers are designed so that the motor may be held in any fixed position as well as being rotated one way or the other. Most stepping motors can be stepped at audio frequencies, allowing them to spin quickly, and with an appropriate controller, they may be started and stopped at controlled orientations.

Stepper motor drivers ordinarily provide a step clock to activate circuitry in the driver electronics to sample and apply current to the windings or "phases" of the associated stepper motor. The amount of current to be applied is a direct function of the desired position of the motor shaft. For rotational motion, current is applied to opposing windings in a stepper motor in a quadrature manner. In a micro-stepping driver, phase currents are applied as a Sine wave to one phase and a Cosine wave to the opposing phase with motor position defined at discrete points along the Sine and Cosine waveforms. Each pulse from an associated step clock, advances the motor to the next position, following the Sine and Cosine drive steps. For motor rotation, the step clock is continuously applied, causing the motor to repetitively move through the micro stepping sequence. To hold the motor at a fixed position, the motor driver must apply a constant current to each winding having a magnitude represented by the value of the Sine and Cosine waveform at the desired position. See U.S. Pat. No. 5,264,770 issued Nov. 23, 1993 for a description of an example stepper motor driver circuit.

Since the motor windings comprise a continuous coil of wire, they exhibit both inductive and resistive characteristics and an associated time constant related to the rise and decay of the applied current. To regulate current, stepper motor drivers periodically apply and remove voltage to the motor windings since the constant application of voltage would otherwise result in excessive powerconsumption. Since the applied current decays with time after voltage is removed, positional phase current is periodically recharged in each winding to hold the motor at a predetermined position. This is usually accomplished by switching a high voltage across each winding and allowing the current to increase until the motor reaches the predetermined value then rapidly switching off the voltage.

A stepper motor microstep driver circuitry typically generates reference values from a digital-to-analog (D/A) converter that produces a digital representation of the Sine or Cosine wave of an applied current. Actual phase currents in each winding are then compared to the reference values. When applying operating current to a motor winding on a rising waveform edge, a high voltage is applied across the winding until the phase current in the winding reaches the reference value. On the falling edge of the current waveform, the current is removed from the winding in order to replicate the Sine or Cosine waveform in the downward direction. This is usually accomplished using either a so-called "fast" or "slow" decay method. If a circuit is used which only provides a fast decay setting, too much ripple is produced in the driving current to the motor resulting in decreased efficiency. If a circuit is used which only provides a slow decay setting, efficiency is increased but not enough current is removed resulting in distorted motion and an increased possibility of creating resonance. Other methods use both slow and fast decay methods on different windings. For example, in U.S. Pat. No. 5,264,770, a charging "on" time for the rising waveform in one winding is used to set a time for a falling waveform in the other winding during fast decay. This method causes high ripple current in low speed operation.

For the reasons stated above, and for other reasons stated below which will become apparent to those skilled in the art upon reading and understanding the present specification, there is a need in the art for a new motor driver and method.

SUMMARY OF THE INVENTION

The above-mentioned problems with stepper motor drivers and other problems are addressed by the present invention and will be understood by reading and studying the following specification.

In one embodiment, a stepper motor control system comprises comparator circuitry to compare a motor phase current with a reference current and provide an output, and a motor current controller coupled to the comparator circuitry and the motor phase to adjust the motor phase current in response to the output. The motor current controller selectively uses slow and fast current decay on the motor phase to reduce the motor phase current.

In another embodiment, a stepper motor control system comprises a sine wave reference generator, a cosine wave reference generator, and comparator circuitry to compare a first motor phase current with a sine wave reference current and compare a second motor phase current with a cosine wave reference current. A motor current controller is coupled to the comparator circuitry and the first and second motor phases to adjust the first and second motor phase currents. The motor current controller increases the first and second motor phase currents to follow an increasing sine wave or cosine wave reference current, and selectively uses slow and fast current decay on the motor phase to reduce the motor phase current to follow a decreasing sine wave or cosine wave reference current.

A method of operating a stepper motor comprises comparing a motor phase current to a reference current, and when the motor phase current is greater than the reference current, reducing the motor phase current to the reference current using a fast current decay process until the motor phase current is below the reference current. The motor phase current is further reduced using a slow current decay process.

A method of operating a stepper motor comprises comparing a first motor phase current to a first reference current that is following a decreasing slope of a sinusoidal waveform, and when the first motor phase current is greater than the first reference current, reducing the first motor phase current to the first reference current using a fast current decay process until the first motor phase current equals the first reference current. The method further comprises measuring a first time period required to decrease the first motor phase current to equal the first reference current, further applying the fast current decay process for a second time period equal to the measured first time period, and further reducing the first motor phase current using a slow current decay process following the second time period.

DETAILED DESCRIPTION OF THE INVENTION

In the following detailed description of the preferred embodiments, reference is made to the accompanying drawings, which form a part hereof, and in which is shown by way of illustration, specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Stepper motor drivers ordinarily provide a step clock to activate circuitry in the driver electronics. For rotational motion in a micro-stepping driver, motor phase currents are applied as a Sine wave to one phase and a Cosine wave to the opposing phase with motor position defined at discrete points along the Sine and Cosine waveforms. Each pulse from an associated step clock advances the motor to the next position, following the path of Sine and Cosine waveform. For smooth motor rotation, the step clock is continuously applied. To hold the motor at a fixed position, the motor driver applies constant current to each winding having a magnitude represented by the value of the Sine and Cosine waveform at desired position. To maintain high efficiency in the driver, a chopping controlled current drive is used. In this technique, the current through the motor windings is sensed and controlled by a chopping control circuit so that the current is maintained within the rated level.

As stated above, stepper motor drivers can use both slow and fast decays to control the stepper motor. In general, a slow decay is used when increasing current in a motor phase, and a fast decay is used to reduce current in a winding. The present invention provides embodiments of motor divers that reduce ripple current along sine and cosine waveforms, especially on the decreasing phase of the waveforms.

The present invention, in one embodiment, provides a chopping control circuit that reduces motor ripple current along Sine and Cosine waveforms, especially on the decreasing phase of the waveforms, over a wide range of motor speeds. The circuit performance is not sensitive to the motor parameters, such as inductance, resistance, etc.

Figure 1:
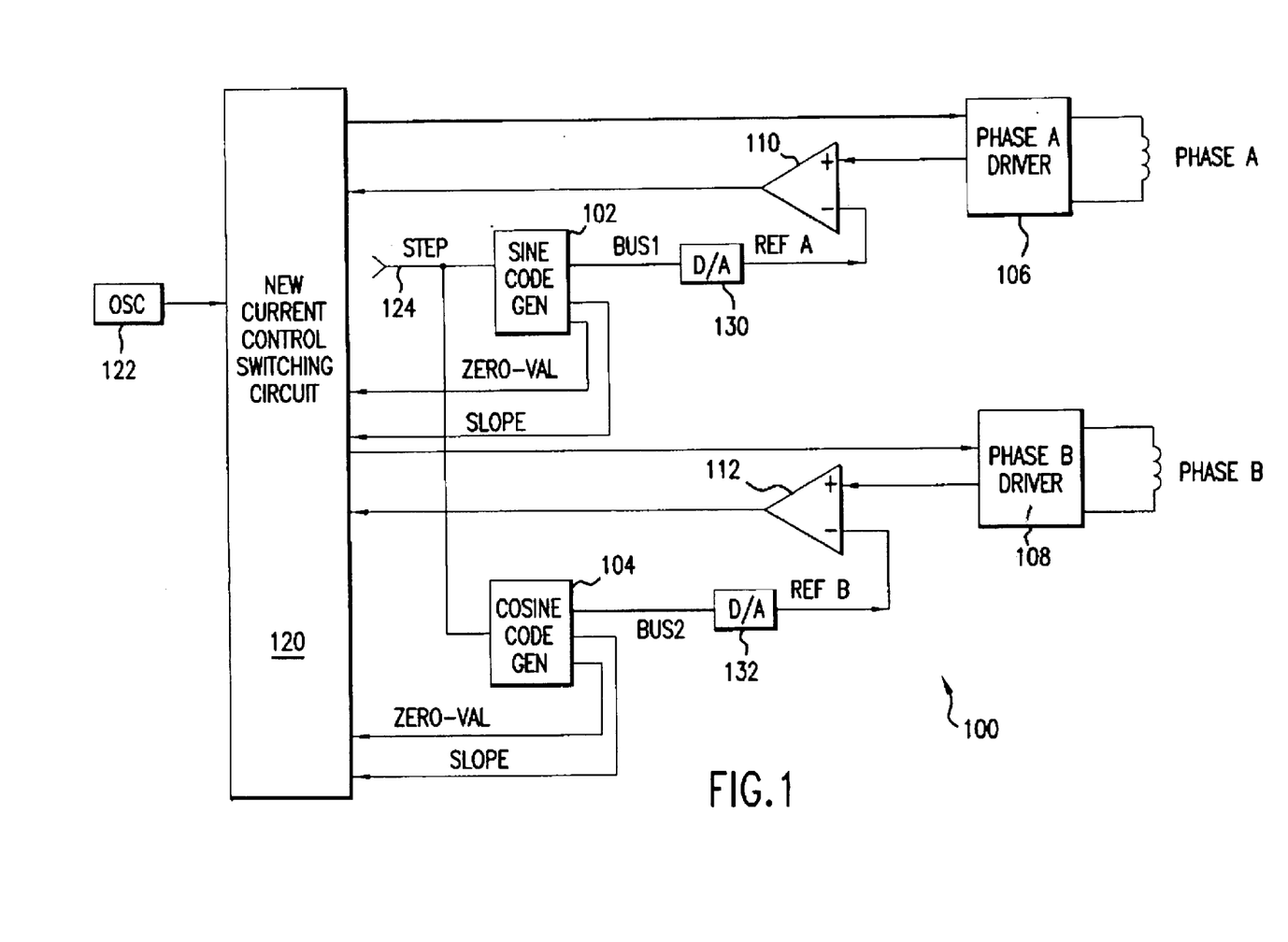
FIG. 1 is a schematic diagram of a motor driver of an embodiment of the present invention.

Referring to FIG. 1, a simplified schematic diagram of a chopping circuit 100 incorporates synchronized sine 102 and cosine 104 wave generators, phase A 106 and phase B 108 drivers, comparators 110 and 112, a current control switching logic circuit 120 and an oscillator 122. In operation, a step clock pulse is provided on input 124 to the Sine Code Generator and Cosine Code Generator. Digitized data, representing one value of Sine wave and Cosine wave outputs, are produced on bus 1 and bus 2. Digital-to-analog (D/A) converters 130 and 132 generate output voltages proportional to the input data from bus 1 and bus 2 respectively. The outputs of the D/A converters are used as reference signals which correspond to desired phase A and phase B currents. As step clocks continue to occur, the D/A output will completely traverse the value of a sinusoid. Internal controls to the control circuit determine the number of levels into which a sinusoid is segmented.

The reference currents are compared to measured currents from the phase A and phase B windings using comparators 110 and 112. Phase A and phase B current detection circuits (not shown in FIG. 1) provide the measured reference currents. The outputs of the comparators are coupled to current control switching circuit 120 to control driver currents, as explained below.

Sine Code Generator 104 and Cosine Code Generator 106 also generate slope signals which indicate rising or falling magnitude of the corresponding Sine and Cosine waveforms. Since the motor phase currents are forced to follow the reference waveforms, the slope signals also indicate when the associated phase A and phase B currents are rising or falling. These slope signals can be coupled to the current control switching circuit if required by the selected implementation. The current control switching circuit controls the fast or slow current decay in the motor phases. In one embodiment, differential current sensing amplifiers are used, and the current control logic is illustrated in the flow chart of FIG. 3, as described below. The flow chart applies to each phase separately. That is, the flow chart includes a path for phase A and another path for phase B.

Figure 2:
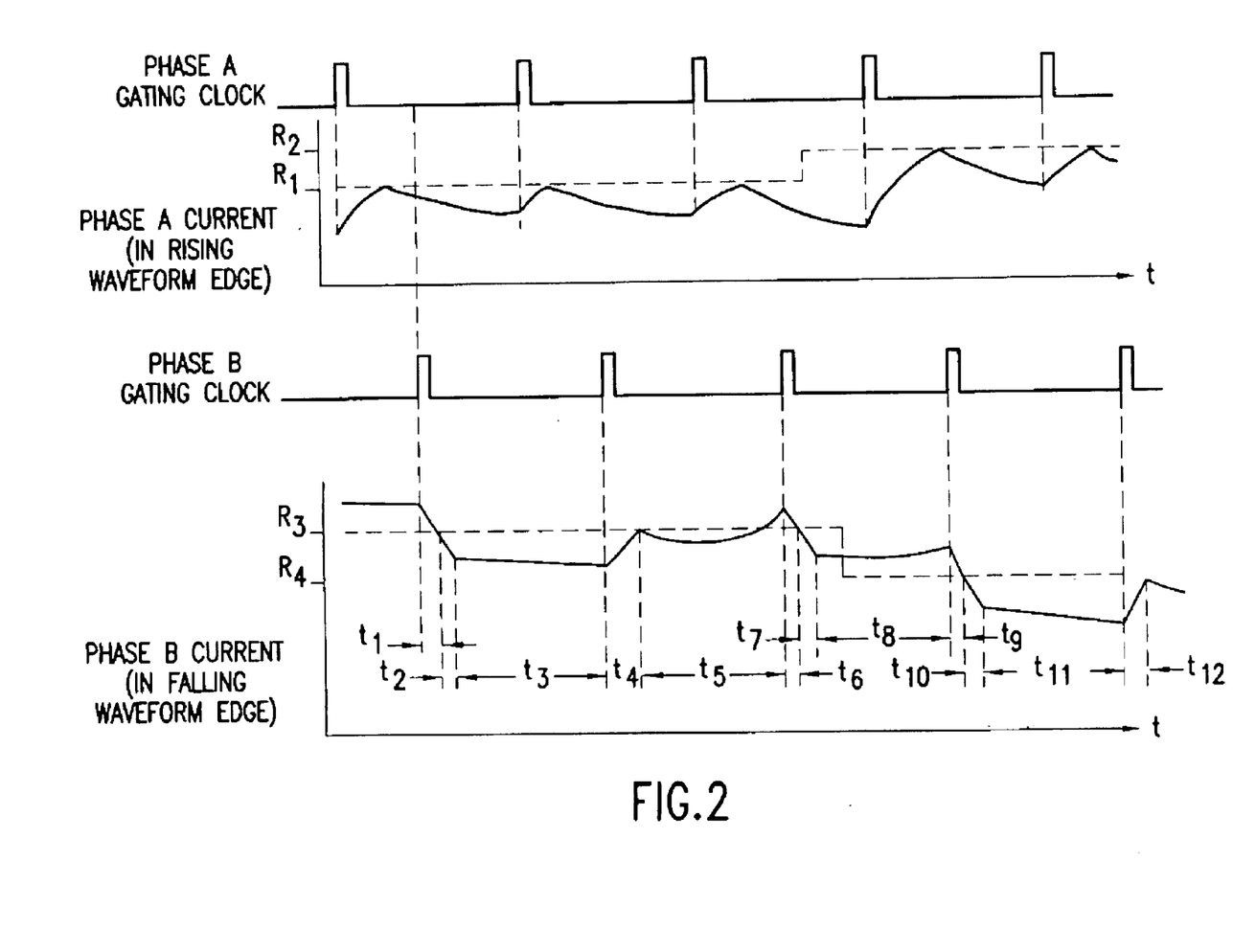
FIG. 2 illustrates gating clocks and phase currents of the motor driver of FIG. 1.

Referring to FIG. 2, representative phase currents and gating clocks are illustrated of one embodiment of the present invention. Two gating clocks (about 22 KHz) are used to sample the outputs of comparators 110 and 112 with the switching circuit 120. In the illustrated timing diagrams, phase A is following a rising waveform (increasing current) and phase B is following a falling waveform (decreasing current). The phase A and phase B gating clocks are 180 degree out of phase. Only one phase current has a rising waveform slope at any time.

It is important to note that current in a motor phase (a coil of wire wrapped around a metallic core) will tend to continue to flow even after a drive voltage is removed. This is because the coil and core have the properties of electrical inductance, which is based on magnetic fields created in the core due to current flow. Any change in current flow is resisted by the inductance. In addition, motion of the motor's rotor induces a "reverse emf" (voltage) into the coil which opposes the applied voltage. The movement of the motor and dissipation of energy as heat will naturally reduce the current eventually, but in an uncontrolled fashion. It also resists an increase in current when a drive voltage is applied. By nature of the motor, as it moves faster it is even more difficult to force additional current into a phase coil, or to reduce it.

In operation, assuming Phase A is in rising waveform slope (rising in magnitude), then Phase B is in falling waveform slope (decreasing in magnitude). Phase A requires increasing current, and Phase B requires a reduction of current. Basically, there are three options to be chosen in current control: applying current (Drive ON), Drive OFF with Fast Decay and Drive OFF with Slow Decay.

Between increasing or decreasing current steps, the phase current is maintained. That is, a reference current is used to maintain a 'constant' current. For example, the first three phase gating clock pulses of FIG. 2 are used to keep the phase currents close to reference currents R1 and R3. Following the third clock signal, phase A current is increased to a new reference current R2, and phase B is decreased to a new reference current R4. In contrast to prior current management systems, the present system switches between fast and slow decay in a way that reduces current ripple at values near zero.

Figure 3:
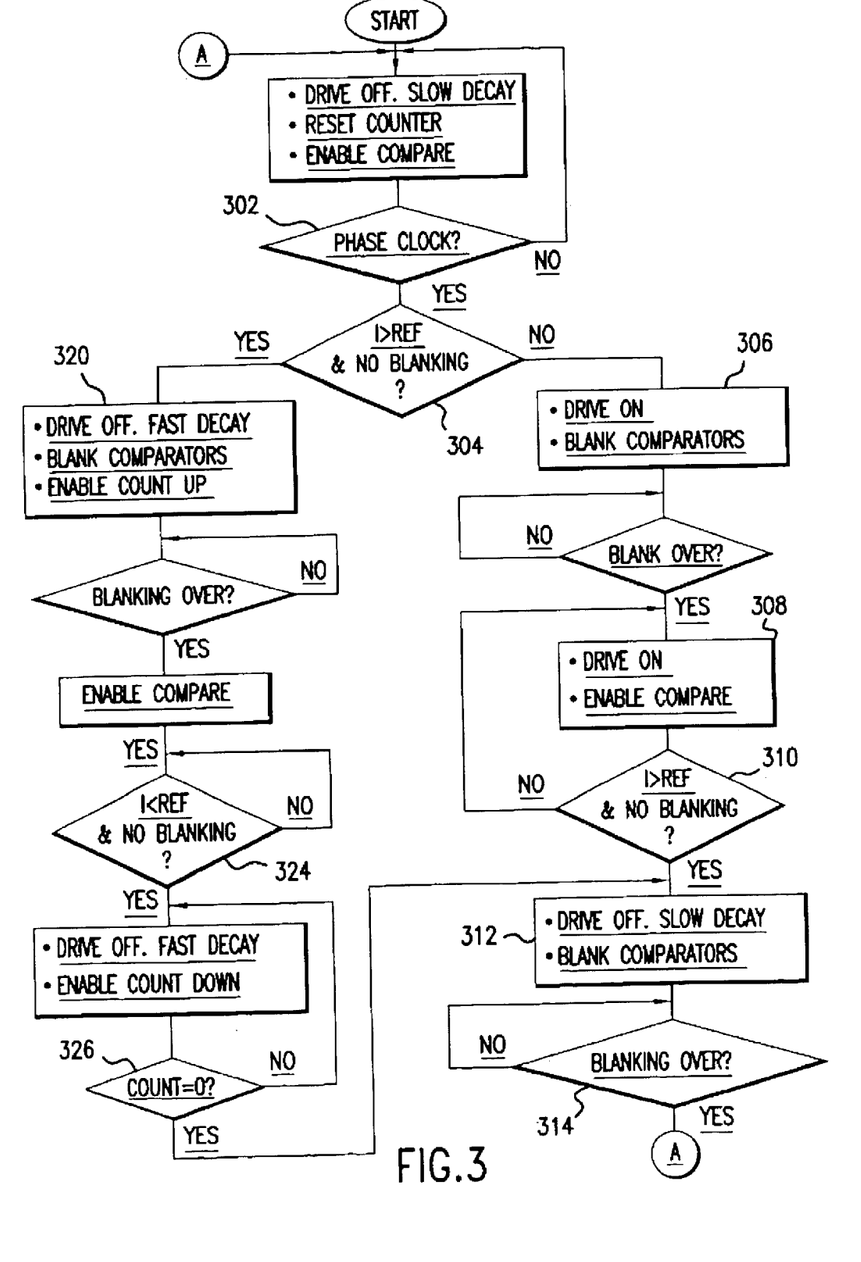
FIG. 3 is a flow diagram of an embodiment of the present invention.

Referring to FIGS. 2 and 3, when a Phase Clock occurs 302 the current (Phase A) is checked to determine if it is greater than the Reference current required by the Sine Wave reference 304. If it is not, then a high voltage (Drive ON) is applied across the motor winding 306. The Phase A current level is ignored momentarily (called a "Blank" of the comparator input) to avoid electronic switching noise. When the blank is over, the comparator is enabled 308 to monitor the actual Phase A current compared with the Reference waveform, R1. When the test 310, "I>Ref" is true, that is, the current is greater than the Reference current, then Phase A switches to slow decay 312. Again, a momentary "Blanking" interval is observed 314. Slow Decay is maintained until another Phase Clock occurs 302. Note that a Blanking period generated by either Phase A or Phase B blanks BOTH phases. When the reference current is increased (4$^{th}$ gating clock signal in this example) to R2, the phase current increases to the new reference current before starting a slow decay.

Likewise, the Flow Chart in FIG. 3 is applied to Phase B as follows. Phase B has a decreasing current magnitude. The switching logic control circuit determines when the Drive ON, Drive OFF Slow Decay and Drive OFF Fast Decay are applied to Phase B. In phase B, both slow decay and fast decays are applied. To avoid cross interference between phase A and phase B, any switching in phase B is prevented during "blanking" periods of phase A. The current regulation during the falling waveform is described as follows.

At the rising edge of Phase B (or "Gating") clock, if the Phase B current is higher than the Reference level R3 304, the path down the left side of the Flow Diagram is taken. A Drive Off fast decay 320 is initiated and the time required to discharge the phase current to the reference current is measured (intervals T1, T6, T9 in FIG. 2). To do this, a counter is enabled to "Count Up" 320. When the Current becomes less than the R3 reference 324, the counter is enabled to "Count Down". During the count down time, the fast decay is maintained for a time period that is equal to the measured time 326 (time intervals T2, T7, T10). At the end of this time, a slow decay is applied until the next gating clock signal (intervals T3, T8, T11). After a Blanking interval 314, the control waits for the next gating clock signal.

At the rising edge of the Phase B Phase Clock, if the Phase B current is less than the required Reference, as illustrated by interval T4, the right side of the Flow Chart is followed. A Drive ON is initiated to apply current while Blanking the Comparator circuitry. When the Blanking period is over, the Comparator circuitry is enabled and the current is compared to the reference. A slow decay is then applied after the current reaches the reference level. The Comparators are Blanked for a short ime and then return to the top of the Flow Chart, again waiting for a Phase Clock. In one embodiment, the motor current controller decreases the motor phase current using only the fast current decay if the reference current is zero. As such, a decision is not made regarding the application of either slow or fast decay, but defaulted to a fast decay. This further reduces current ripple at motor phase current values near zero.

Figure 4A:
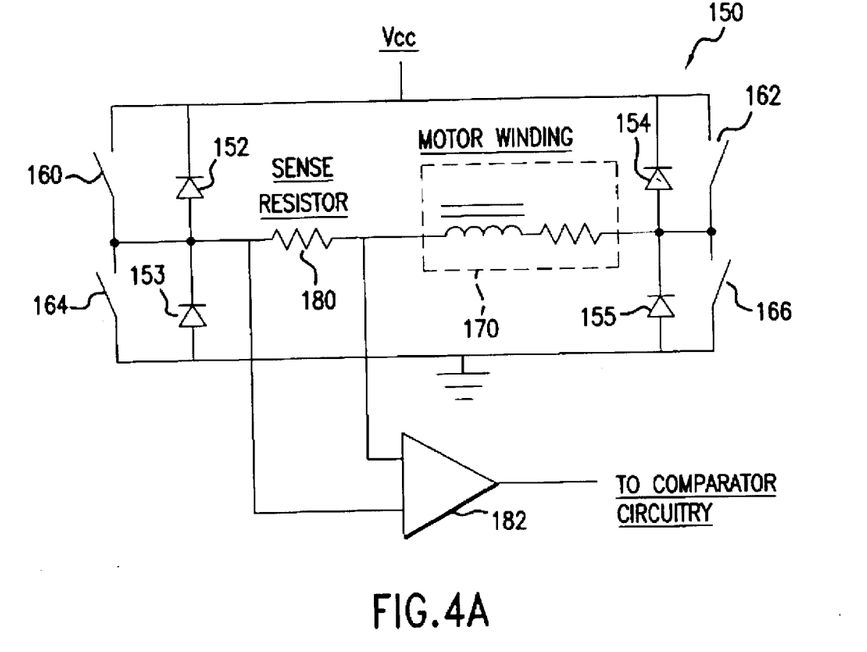
FIG. 4A is a schematic diagram of an H-bridge.

There are different circuit designs that can be used to implement the above-described operation. Two possible circuit designs are described below following a more detailed description of fast decay and slow decay, As stated above, there are two methods ("fast" and "slow" decay) that can be used to remove current from motor winding. Referring to FIG. 4A, an H-bridge 150 is illustrated that includes four diodes 152–155 coupling the motor winding to power supply connections. Two source 160 and 162 and two sink 164 and 166 switches are coupled to selectively bypass the diodes. During "fast" decay all of the switches are off. In this configuration, the winding 170 is connected between ground and the power supply voltage through the diodes. At the moment the switches are turned off, as described above, the current in the winding tends to continue to flow in the same direction due to the inductance properties of the winding. The inductance generates an internal voltage across the winding, which is sufficiently greater than the applied voltage, to force the current to flow from ground into the power source, resulting in increased energy dissipation. During "slow" decay, either source 1 and source 2, or sink 1 and sink 2 are turned on so that the voltage across the winding is very small. The energy dissipation is greatly reduced in slow decay. A sense resistor 180 is coupled in series with the motor winding.

Figure 4B:
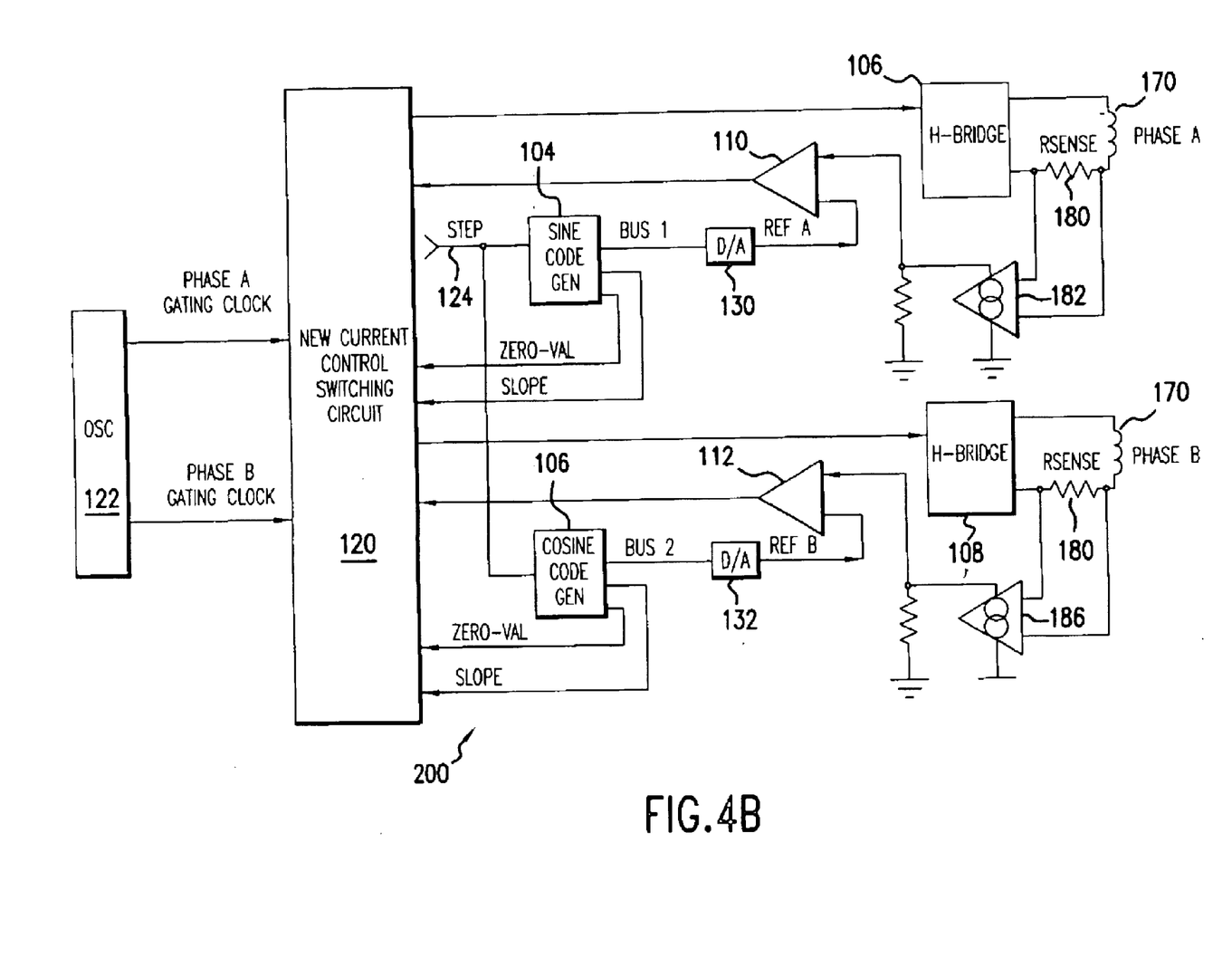
FIG. 4B is a schematic diagram of a motor driver of another embodiment of the present invention.

Referring to FIG. 4B, one embodiment of a chopping circuit 200 of the present embodiment, which operates according to the flow chart of FIG. 3, is described. The chopping circuit is similar to the circuit of FIG. 1 with the H-bridge 106 and 108 and sense resistors 180 illustrated. The sense resistor 180 is coupled in series with the motor winding. A differential amplifier is coupled to the sense resistor to provide an input to the comparator circuit for each phase.

In operation, a step clock pulse is inputted to the Sine Code Generator 104 and the Cosine Code Generator 106. The resulting digitized data, representing a Sine wave and a Cosine wave output, is produced on bus 1 and bus 2. The D/A converters 130 and 132 generate output voltages proportional to the input data from bus 1 and bus 2 respectively. The outputs of the D/A converters provide the reference current signals that correspond to desired phase A and B currents. The reference voltage is then compared to the currents in the corresponding phase A and B windings using comparators 110 and 112. The phase currents are determined by using differential amplifiers 182 and 186 coupled across the sense resistor of each phase. The outputs of the comparators are used by the current control switching logic circuit 120 to indicate when the applied currents have reached their predetermined reference levels. The current control switching logic circuit then implements the logic for the fast or slow decay selection discussed above.

The sine code generator and cosine code generator, the gating clock generator and the current control switching logic circuit can be implemented with a single field programmable gate array (FPGA) or an application specific integrated circuit (ASIC).

Controlling the current in the winding with a sequence described in the table 1 can reduce unnecessary common mode noise of the differential amplifier by limiting the voltage change on the sense resistor. Table 1 would change if the sense resistor in FIG. 4A were moved to the opposite side of the motor coil.

TABLE 1

|  | Current direction | Applying current | Slow decay | Fast decay |
| --- | --- | --- | --- | --- |
| Absolute current value in rising waveform slope | Positive | Source 160 on, source 162 off, sink 164 off, sink 166 on | Source 160 on, source 162 on, sink 164 off, sink 166 off | N/A |
|  | Negative | Source 160 off; source 162 on, sink 164 on, sink 166 off | Source 160 off, source 162 off, sink 164 on, sink 166 on | N/A |
| Absolute current value in falling waveform slope | Positive | Source 160 on, source 162 off, sink 164 off, sink 166 on | Source 160 off, source 162 off, sink 164 on, sink 166 on | Source 160 off, source 162 off, sink 164 off, sink 166 off |
|  | Negative | Source 160 off source 162 on, sink 164 on, sink 166 off | Source 160 on, source 162 on, sink 164 off, sink 166 off | Source 160 off, source 162 off, sink 164 off, sink 166 off |

In addition, the current control switching logic circuit can include a mask, or blank, with duration of sufficient time to mask the noise. The noise results from suddenly switching the voltage onto the winding. Inter-winding capacitance allows a spike to occur in the current waveform. The advantage of this circuit is that senses current continually.

Figure 5A:
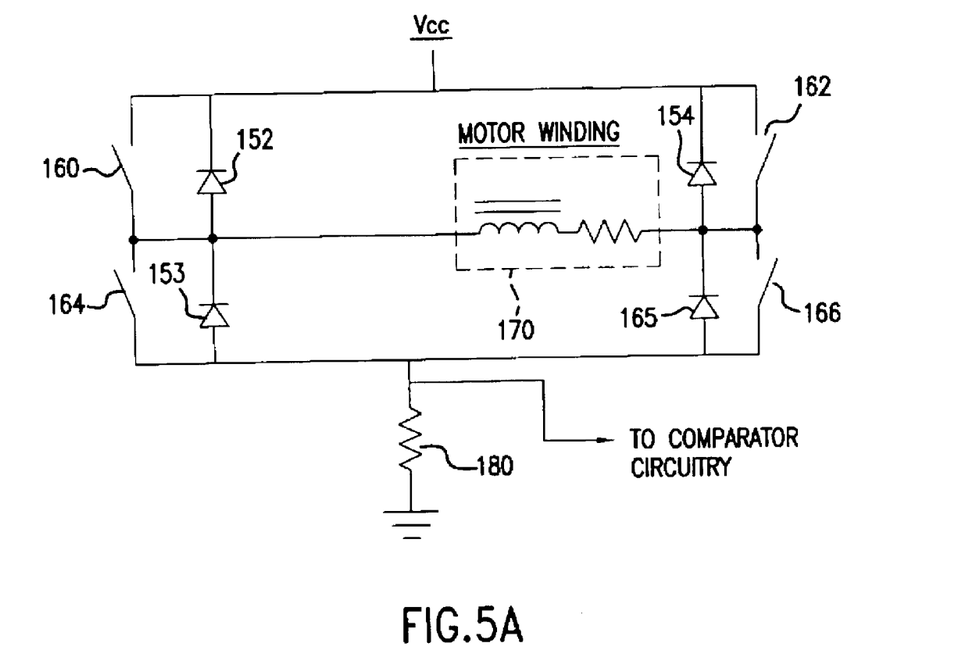
FIG. 5A is a schematic diagram of another H-bridge.
Figure 5B:
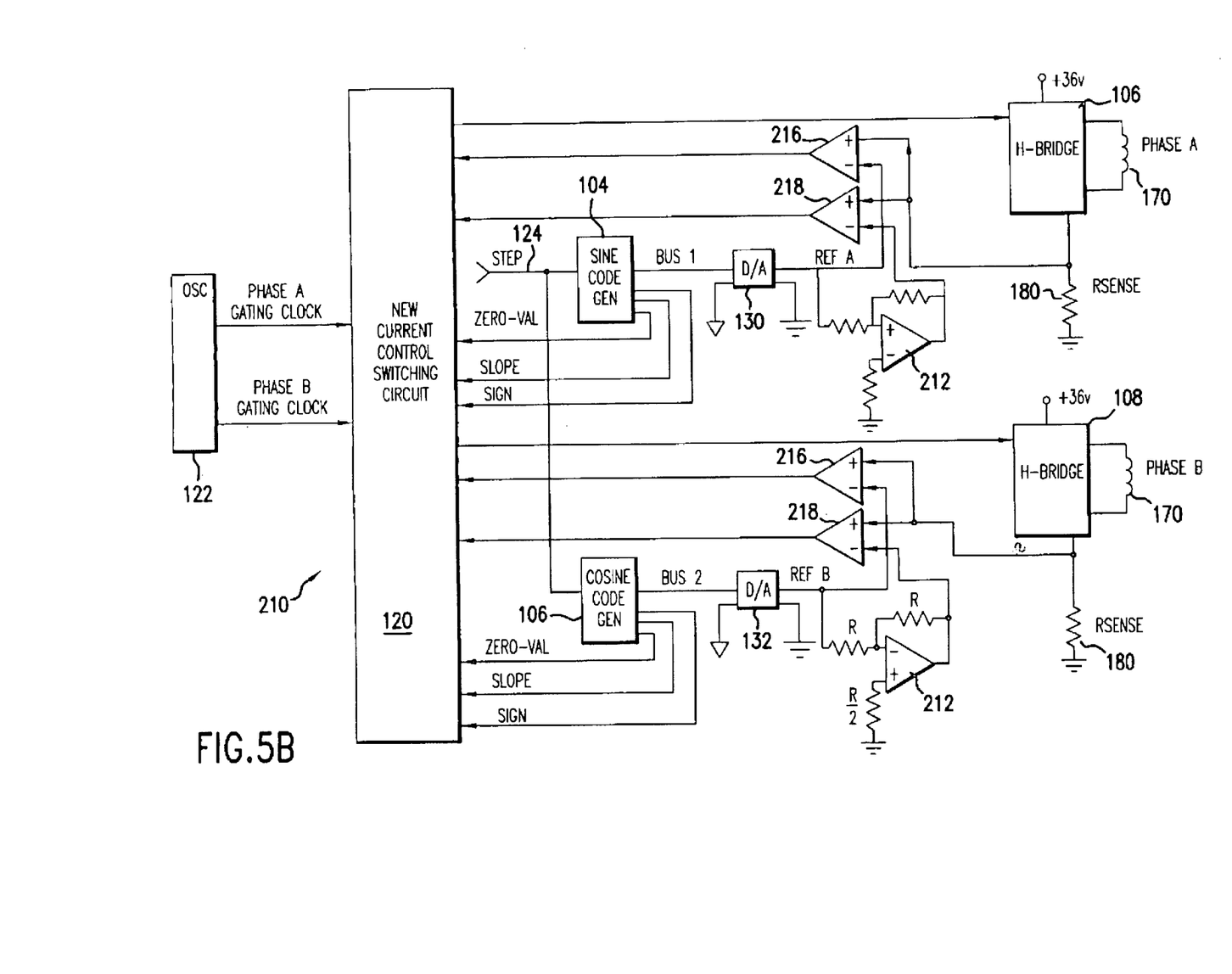
FIG. 5B is a schematic diagram of a motor driver of another embodiment of the present invention.

Referring to FIGS. 5A and 5B, an alternate embodiment of a chopping circuit 300 is described. The circuit is basically the same as shown in FIG. 4, but eliminates the differential amplifier circuitry. Sense resistor 180 is electrically connected between the winding 170 and ground by closing switch 164 or 166 during operation, see FIG. 5A. The current sense circuit in phase A and phase B are identical and include two comparators (216 and 218) and an inverting amplifier (212). Comparator 216 compares the sense voltage and reference voltage from the D/A. Amplifier 212 inverts the output of the D/A converter. This inverted output is then compared with a sense voltage provided using comparator 216. The current control switching logic circuit 120 accepts only the output signal from comparator 216 when the phase is in "apply current" mode or the sense resistor voltage is positive. The current control switching logic circuit accepts only the output signal from comparator 218 when the phase is in "Drive OFF fast decay" mode, which is when the sense resistor voltage is negative. The sense voltage is positive (above the ground) if applying current to the winding. The sense voltage is negative (below the ground) in the Drive OFF fast decay. There is no sense voltage in slow decay mode. Therefore, the driver is turned ON to measure the current. As a result, the method of control is somewhat different from the flow chart described above. The "Slope" and the "Zero" signals out of the Sine (or Cosine) generators must be utilized.

In the rising waveform slope, there are only "applying current", Driver ON, mode and "Driver Off/Slow Decay" mode. The current control switching logic circuit 120 applies current to the winding regardless of a current level from a previous slow decay cycle, since there can be no measurement of the current in Slow Decay Therefore, this is a difference between the operation of the circuits of FIGS. 4 and 5B in the rising waveform slope.

In the falling waveform edge, however, the current control switching logic circuit of FIG. 5B needs to know that the winding current during slow decay is above or below the reference before making decision to switch to a fast decay. In operation, a Drive ON "apply current" mode is implemented for a very short time to detect the current in the winding. Based on this level (higher, lower or equal to reference level), the current regulation criteria described above is implemented.

There is typically a voltage spike developed across the sense resistor when the H-bridge output turns on. This spike is caused by noise in the system plus a reverse recovery current of the re-circulating diode that flows through the sense resistor. If the magnitude of this spike is high enough to exceed the reference voltage, the comparator can be fooled to give an erroneous signal to the current control switching logic circuit. A solution to this problem is to use dead time, or "Blanking" time, (starting from the rising edge of gating clock) in the current control switching logic circuit 120 to mask out the spike. The Blanking time is set to be longer than the sum of propagation delay plus the duration of the spike (usually in the range of 50 to 200 ns). In addition, be voltage across the sense resistor changes from positive to negative in a short time period when the circuit switches from applying current to fast decay. The current control switching logic circuit can set a Blanking time to ignore the input signal from corresponding comparator for a short time (no more than 3 microseconds) and then allow the comparator's output to control the current again.

Note that in the Rising portion of the waveform current, the control algorithm could be implemented just as in the Falling portion. However, in practice, the current in the Increasing phase is usually always lower than the reference when the next Phase clock occurs. The most significant issue is that in the Decreasing slope, or current, portion where current must be continually removed, but because of mechanical resonance that may occur at different motor speeds, the current level is unpredictable.

The advantage of this embodiment is cost saving because no differential amplifier is required. The drawback is that the winding current can be disturbed during the current detection period.

Conclusion

A stepper motor control circuit has been described that reduces ripple current. The control circuit applies both fast and slow current decays to a motor phase when current is being reduced in the motor phase while following a falling current waveform. The control circuit uses an initial fast decay to reduce a winding current and then switches to a slow decay until a winding current is sampled again. The control circuitry samples a winding current and compares the sampled current to a reference current to determine if current is to be applied or reduced using fast and/or slow decay methods. Different winding current sample circuits have been described. One embodiment provides constant current sensing and an alternate embodiment allows selective current sensing.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A stepper motor control system comprising:

comparator circuitry to compare a motor phase current with a reference current and provide an output; and a motor current controller coupled to the comparator circuitry and a motor phase to adjust the motor phase current in response to the output, wherein the motor current controller selectively uses slow and fast current decay on the motor phase to reduce the motor phase current and the motor current controller decreases the motor phase current to the reference current using the fast current decay and switches to the slow current decay following a defined time period;

wherein the defined time period is equal to twice an elapsed time required to reduce the motor phase current to the reference current.

2. A stepper motor control system comprising:

comparator circuitry to compare a motor phase current with a reference current and provide an output; and a motor current controller coupled to the comparator circuitry and a motor phase to adjust the motor phase current in response to the output, wherein the motor current controller selectively uses slow and fast current decay on the motor phase to reduce the motor phase current and the motor current controller decreases the motor phase current to the reference current using the fast current decay and switches to the slow current decay following a defined time period; and wherein the motor current controller decreases the motor phase current using only the fast current decay if the reference current is zero.

3. A stepper motor control system comprising:

a sine wave reference generator;

a cosine wave reference generator;

comparator circuitry to compare a first motor phase current with a sine wave reference current, and compare a second motor phase current with a cosine wave reference current; and a motor current controller coupled to the comparator circuitry and first and second motor phases to adjust the first and second motor phases to adjust the first and second motor phase currents, wherein the motor current controller increases the first and second motor phase currents, wherein the motor current controller increases the first and second motor phase currents to follow an increasing sine wave or cosine wave reference current, and selectively uses slow and fast current decay on the motor phase to reduce the motor phase current to follow a decreasing sine wave or cosine wave reference current, wherein the motor current controller decreases the motor phase current to the reference current using the fast current decay and switches to the slow current decay following a defined time period is equal to twice an elapsed time required to reduce the motor phase current to the reference current.

4. The stepper motor control system of claim 3 wherein the first motor phase current is measured using a resistor coupled in series with a winding of the first motor phase and a different amplifier.

5. The stepper motor control system of claim 3 wherein the second motor phase current is measured using a resistor coupled in series with a winding of the second motor phase and a differential amplifier.

6. The stepper motor control system of claim 3 wherein the first motor phase current is measured using a resistor coupled to a winding of the first motor phase.

7. The stepper motor control system of claim 3 wherein the second motor phase current is measured using a resistor coupled to a winding of the second motor phase and a differential amplifier.

8. A stepper motor control system comprising:

a sine wave reference generator;

a cosine wave reference generator;

comparator circuitry to compare a first motor phase current with a sine wave reference current, and compare a second motor phase current with a cosine wave reference current; and a motor current controller coupled to the comparator circuitry and first and second motor phases to adjust the first and second motor phase currents, wherein the motor current controller increases the first and second motor phase currents to follow an increasing sine wave or cosine wave reference current, and wherein the motor current controller decreases the motor phase current to follow a decreasing sine wave or cosine wave reference current using the fast current decay and switches to the slow current decay following a defined time period, wherein the defined time period is equal to twice an elapsed time required to reduce the motor phase current to the reference current.

9. A method of operating a stepper motor comprising:

comparing a motor phase current to a reference current; and when the motor phase current is greater than the reference current, reducing the motor phase current to the reference current using a fast current decay process until the motor phase current is below the reference current, further reducing the motor phase current using a slow current decay process, when the motor phase current is lower than the reference current, increasing the motor phase current to the reference current; and reducing the motor phase current using the slow current decay process after the motor phase current reaches the reference current; and when the reference current equals zero, reducing the motor phase current using the fast current decay process.

10. A method of operating a stepper motor comprising:

comparing a first motor phase current to a first reference current that is following a decreasing slope of a sinusoidal waveform;

when the first motor phase current is greater than the first reference current, reducing the first motor phase current to the first reference current using a fast current decay process until the first motor phase current equals the first reference current;

measuring a first time period required to decrease the first motor phase current to equal the first reference current;

further applying the fast current decay process for a second time period equal to the measured first time period; and further reducing the first motor phase current using a slow current decay process following the second time period.

11. The method of claim 10 further comprises:

comprising a second motor phase current to a second reference current that is following an increasing slope of a sinusoidal waveform;

when the second motor phase current is less than the second reference current, increasing the second motor phase current until it is equal to the second reference current; and reducing the second motor phase current using a slow current decay process after the second motor phase current is equal to the second reference current.

12. The method of claim 10 further comprises:

when the first motor phase current is less than the first reference current, increasing the first motor phase current until it is equal to the first reference current; and reducing the first motor phase current using a slow current decay process after the first motor phase current is equal to the first reference current.

13. The method of claim 10 wherein the first reference current equals zero, further comprises reducing the first motor phase current using a fast current decay process.

* * * * *